United States Patent [19]
Rispoli et al.

[11] 3,719,501
[45] March 6, 1973

[54] PROCESS FOR PREPARING A SNACK FOOD PRODUCT

[75] Inventors: Joseph M. Rispoli, Douglaston; Anthony C. Capossela, Jr., North Tarrytown, both of N.Y.

[73] Assignee: General Foods Corporation, White Plains, N.Y.

[22] Filed: Oct. 7, 1968

[21] Appl. No.: 765,679

[52] U.S. Cl. .................................................99/83

[51] Int. Cl. ..............................................A23l 1/10

[58] Field of Search............................99/83, 80, 81

[56] References Cited

UNITED STATES PATENTS

| | | | |
|---|---|---|---|
| 3,076,711 | 2/1963 | Gerkens | 99/81 |
| 3,174,864 | 3/1965 | Schiebel | 99/1 |
| 3,259,503 | 7/1966 | Tan et al. | 99/83 |

*Primary Examiner*—Raymond N. Jones
*Attorney*—Thomas V. Sullivan and Bruno P. Struzzi

[57] ABSTRACT

A snack food product comprising popped popcorn in a dough matrix containing flours and starch. The snack food product preferably contains comminuted popcorn in a cooked dough matrix of tapioca flour, corn flour and potato starch, and is deep fat fried. The process for preparing the product is also described.

5 Claims, No Drawings

PROCESS FOR PREPARING A SNACK FOOD PRODUCT

BRIEF SUMMARY OF THE INVENTION

Recently, snack food products of many types have become widely available. Such products include chips, puffs, and cracker-type snacks. In chips and puffs, such as potato or potato-based chips, corn chips and corn puffs, foodstuff inserts are usually not included. On the other hand, with cracker-type snacks, foodstuffs such as vegetable, meat and/or cheese pieces, may be incorporated therein.

More recently, however, the inclusion of foodstuff inserts in chips and puffs has been described. Thus, Schiebel, U.S. Pat. No. 3,174,864, discloses a snack food containing popcorn in a carbohydrate base, and Tan et al., U.S. Pat. No. 3,259,503, teach a snack product in which a foreign food adjunct, such as nuts, fruits, vegetables and the like, is incorporated in a doughy substrate.

Although the snack products of Schiebel and of Tan et al. represent a different approach in the manufacture of snacks which theretofore was concerned with the production of generally non-heterogeneous products, typically potato chips, corn chips and corn puffs, such products possess flavor, texture and appearance characteristics which are markedly distinct from those of the snack food product of this invention.

It is an object of this invention to provide a snack food product comprising popped popcorn in a dough matrix containing flours and starch.

It is a further object of this invention to produce a novel snack food product comprising comminuted popped corn in a cooked dough matrix containing a combination of flours and starch.

Another object of this invention is to prepare a deep fat fried snack food product comprising comminuted popped popcorn in a cooked dough matrix containing flours and starch in which the ingredients of the product are present in specifically defined amounts with the result that a product having unique flavor, texture and appearance, is obtained.

A still further object of this invention is to provide a process for making a novel snack food product.

The foregoing objects and others are realized by employing a dough matrix containing a combination of flours and starch so as to result in a novel snack food product having therein popped popcorn.

The popped popcorn may be whole or comminuted, and while mixtures of various flours may be utilized, tapioca flour and corn flour are preferred. Similarly, although edible starches of many types may be used, potato starch is preferred. The dough matrix is preferably cooked before the popped popcorn is admixed therewith and the ratio of the popped popcorn to the matrix on a dry weight basis may range from about 1 to 1 to 3 to 1. Following incorporation of the popped popcorn in the cooked dough matrix, the mixture is shaped and formed, cooled and dried. The dried product may be shipped and stored in such form for subsequent final cooking. Alternatively, the dried product may be cooked as the final step of the process by immersing it in hot oil using conventional deep fat frying techniques.

DETAILED DESCRIPTION OF THE INVENTION

As indicated hereinbefore, the dough matrix of the snack food product of this invention contains a mixture of flours and starch. Although flours obtained from a variety of cereals, grains and tubers, may be readily employed, it has been found that the combination of tapioca flour and corn flour provide a snack food product with very desirable flavor, texture and appearance characteristics. Thus, while flours such as rice, oat, wheat and the like may be used in minor amounts, it has been found that tapioca flour results in good texture in the final product and has the advantage of permitting puffing during deep fat frying which is also advantageous. Moreover, because of its bland flavor, tapioca flour generally does not mask the flavor impact of the other principal ingredients of the snack food product. The use of corn flour is advantageous in that since popcorn is an essential ingredient of the snack food product, corn flour provides, together with popcorn, an overall predominating corn flavor and texture. Although corn puff and corn chips are well-known, such products are usually prepared from corn grits and/or corn masa flour which, while they may be used in minor amounts in the matrix of the snack food product of this invention, are not as essential as corn flour. Further, even though it is possible to employ any one or more of a large number of food starches, such as waxy maize, corn, rice, tapioca and the like, it has been surprisingly found that potato starch, more particular a pregelatinized potato starch, provides extremely desirable characteristics in the snack food product.

In making the dough matrix, it has been found advantageous to employ the preferred combination of starches and flours within a certain range. Thus, the use of a ratio of 1 to 1 to 1 of tapioca flour to corn flour to potato starch has been noted to furnish very desirable flavor, texture and appearance characteristics in the final snack food product.

Popped popcorn may be incorporated into the dough matrix, preferably after the matrix has been cooked to gelatinization temperatures. The popcorn may be either whole or comminuted, that is, discrete exploded kernels may be used or popcorn which has been chopped, sliced, ground or otherwise subdivided, may be employed. It has been found advantageous to use a ratio of popped popcorn to dough matrix ranging from about 1 to 1 to 3 to 1, preferably 2 to 1, on a dry weight basis. It appears that with lower ratios of popped popcorn to dough matrix, fat pickup during final processing, e.g., in deep fat frying, may be excessive. The use of comminuted popped popcorn is especially desirable since the final snack product is seen to be somewhat less fragile and in-processing difficulties are avoided because of the higher density of the comminuted popped popcorn.

In making the dough matrix, the ingredients of flours and starch are preblended and then introduced to a suitable cooking vessel containing water. The preblend may contain other ingredients such as salt and other flavor adjuncts, but it is obvious that such ingredients may be incorporated into the cooking water. The cooking of the mixture of the ingredients can be accomplished by any one of a number of known cooking methods. For example, batch continuous processing of the dough may be resorted to. Generally, the amount of water employed in cooking of the dough would be from 1 to 1 to 4 to 1 parts per parts of preblended ingredients. Cooking is carried out at temperatures of about 170° to 200°F. for a period of 5 to 60 minutes. Following cooking of the dough, popped popcorn is blended with the matrix and thoroughly distributed therein.

Subsequently, the popcorn-containing cooked dough is then shaped and formed either into the general shape desired for the end product or into a shape for permitting later additional shaping and forming. The popcorn-containing matrix may be extruded and sheeted, extruded and sliced, rolled into sheets and later cut and formed into desired shapes such as chips or otherwise processed to permit ease in handling as well as to provide shapes of different kinds which would be desired for the final snack food product.

The shaped and formed mixture is then cooled and dried to a moisture content of about 8 to 12 percent. During this part of the process, conditioning and/or tempering of the dough matrix may take place but it is apparent that conditioning and/or tempering may be done prior to shaping and forming the popped popcorn-containing dough matrix.

The dried, shaped and formed intermediate product may then be shipped and stored as such. Alternatively, the final step of the process may be carried out by immersing the intermediate product in an edible hot oil for brief periods of time to finish-cook and puff the product. The oil temperature may range from 350° to 425°F. and the time interval may range from 5 to 45 seconds. Alternatively, roasting, fluidized bed, and other methods of finish-cooking the product may be used. Generally, deep fat frying is employed inasmuch as the flavor, texture and appearance characteristics appear to be very well developed with such technique.

Following deep fat frying, the snack food product, now having a moisture content of approximately 1 to 4 percent, is coated with salt or other flavor adjuncts, such as spices, sauces, condiments and the like. Such flavor adjuncts as well as foodstuff pieces may, however, also be blended into the dough matrix at the time the popcorn is incorporated therein.

In order to further illustrate the present invention, but in no way to limit it, the following illustrative examples are given:

EXAMPLE I

Ingredients, in parts by weight, and processing conditions for a snack food product containing whole popped popcorn are as follows:

| Popcorn-Containing Dough Phase | Batch (parts) | Percent |
|---|---|---|
| Popped Popcorn | 2540.0 | 34.7 |
| Dough Matrix | | |
| Tapioca Flour | 380.0 | 5.2 |
| Corn flour | 380.0 | 5.2 |
| Potato Starch, pregelatinized | 380.0 | 5.2 |
| Salt | 12.8 | 1.7 |
| Water | 3500.0 | 48.0 |
| Totals: | 7192.8 | 100.0 |

| Finished Snack Food Product | % |
|---|---|
| Solids from Popcorn-containing Dough Phase | 61 |
| Fat | 35 |
| External Salt | 2 |
| Moisture | 2 |
| Total: | 100 |

Water is added to a Baker Perkins steam jacketed mixer and is brought to a boil. A dry-blended mixture of tapioca and corn flours, potato starch and salt is then added to the mixer and the mixture is gelatinized by cooking for approximately 5 minutes. The popped popcorn is then slowly added to the cooked dough and blending is continued for approximately 5 minutes. The popcorn-containing dough is then removed from the mixer and is extruded into one-fourth inch thick sheets in an Ambretti extruder. The sheets are then passed through rollers to obtain one-eighth inch thick flaked sheets which are subsequently air dried to a 10 percent moisture content. The dried flaked sheets are broken into strips which are then deep fat fried in a hot (375°F.) oil bath for about 30 seconds until cooking and puffing are complete. The puffed snack food product is removed from the bath, cooled, dusted with salt and packaged.

EXAMPLE II

Ingredients expressed in pounds, and processing conditions for a snack food product containing comminuted popped popcorn are as follows:

A. Corn is popped in electric corn poppers. The corn enters at 12 percent moisture and is 4 percent after popping. The bulk density of the popcorn is 1.37 lbs./cu. ft. The popcorn is then screened to remove all unpopped kernels in a vibratory separator on a 2 mesh screen. About 7 lbs./hr. are removed and 68 lbs./hr. of popcorn are passed on. The popcorn is subsequently passed through a disintegrator using a three-eighths inch screen, and collected.

B. Dry ingredients for the matrix—tapioca flour, corn flour, pregelatinized potato starch and salt in 1 to 1 to 1 to 0.4 ratio—are preblended in a ribbon blender for 25 minutes. Forty pounds of the preblended flours, starch and salt are mixed with 94 pounds of cold water in a steam jacketed kettle with side scrapper agitation. The matrix slurry is heated to 190°F. with constant agitation. The time required for heating is 30 minutes.

C. A 25 gallon Sigma Mixer is used to blend the matrix and and popcorn, 59.5 lbs. of popcorn is fed through a hopper to the 114 lbs. of matrix until all is added and well mixed. Approximately 20 minutes mixing is required. The popcorn-containing dough is removed from the mixer and 170 lbs. of dough at 46 percent $H_2O$ is then ready for extrusion.

D. The extruder is a twin auger type which has a capacity of 250–1,440 lbs./hr. and a die with a 1⅛-inch circular opening with a three-fourths inch land. The extruded ropes are cut for tempering. The exit moisture is 45 percent for the 168 lbs. of ropes.

E. The ropes are placed on trays holding 13 lbs. each and tempered at 70°F./50 percent R.H. for 18–24 hrs.

F. The tempered ropes at approximately 42 percent $H_2O$ are fed onto a three-bladed slicer with a setting of 0.054 inch.

G. The slices are then passed onto a vibratory screen with a 1 inch mesh to remove all brokens and fines. About 7 lbs. are lost from the slicing and screening operation.

H. One hundred fifty two lbs. of slices at 42 percent $H_2O$ are fed via a partitioned conveyor into a 5 tiered belt dryer. The total drying time is 2½ hrs. and the drying temperature is 110–115°F. The chips leave at 10 percent H₂O at a total weight of 75 lbs. from the original batch. They are placed in drums to await frying or shipment.

I. The sliced and dried chips are fried in an edible oil at a temperature of 375°F. for 25 seconds in a commercial fryer.

J. The fried chips are drained and are at about 2 percent moisture. They are placed in a rotating drum and coated with 1.6 percent surface salt by weight.

While the foregoing invention has been described in conjunction with certain preferred embodiments, ingredients and processing conditions, it is apparent that a number of modifications may be made without departing from the spirit and scope of this invention as defined in the appending claims.

We claim:

1. A process for preparing a snack food product which comprises making a dough mixture containing starch and a mixture of flours, cooking said mixture to gelatinize the same, adding popped popcorn to said cooked dough mixture, shaping and forming the popped popcorn-containing cooked dough mixture, cooling and drying said shaped and formed mixture to a moisture content of about 8 to 12 percent, said popped popcorn added at a level such that the ratio of popped popcorn to the cooked dough mixture is about 1 to 1 to 3 to 1, by weight.

2. A process as in claim 1 in which shaping and forming are carried out by extruding and sheeting the popcorn-containing cooked dough mixture.

3. A process as in claim 1 in which shaping and forming are carried out by extruding and slicing the popcorn-containing cooked dough mixture.

4. A process as in claim 2 in which the popped popcorn is comminuted.

5. A process as in claim 2 further comprising deep fat frying said shaped, dried mixture.

* * * * *